April 24, 1951      L. B. JAMES      2,550,355

FORAMINATED VASE, CANDLE, AND FLOWER HOLDER

Filed April 17, 1950

LUCY BROWN JAMES,
INVENTOR.

BY

ATTORNEYS.

Patented Apr. 24, 1951

2,550,355

UNITED STATES PATENT OFFICE 2,550,355

FORAMINATED VASE, CANDLE, AND FLOWER HOLDER

Lucy Brown James, Greenville, N. C.

Application April 17, 1950, Serial No. 156,291

7 Claims. (Cl. 211—74)

This invention relates to a holder for supporting a plurality of articles such as flowers, vases, candles and the like and more especially to a foraminated flower and vase support or holder and its primary object is to provide a flower holder formed of a coarse wire mesh material and which has one or more openings of various sizes therein defined by annular wires, with these openings being of a substantially greater diameter than the openings in the wire mesh. The larger openings have perforated cups or depressions formed therein and these cups are adapted to receive vases, candles and the like while the remaining openings in the wire mesh are adapted to receive the stems of cut flowers. The holder is adapted to be placed in a suitable container for holding water so the lower ends of stems of flowers will be surrounded by the water.

It is another object of this invention to provide an apparatus of the type described having upwardly extending wires whose lower ends are connected to the annular wires defining the large openings and these upwardly extending wires being connected at their upper ends and, in some instances, intermediate their ends, to annular wires of varying diameter according to the configuration of the vase or candles which may be inserted within the confines of the annular wires.

Some of the objects of the invention having been stated, other objects will appear as the description proceeds when taken in connection with the accompanying drawings, in which—

Figure 1:
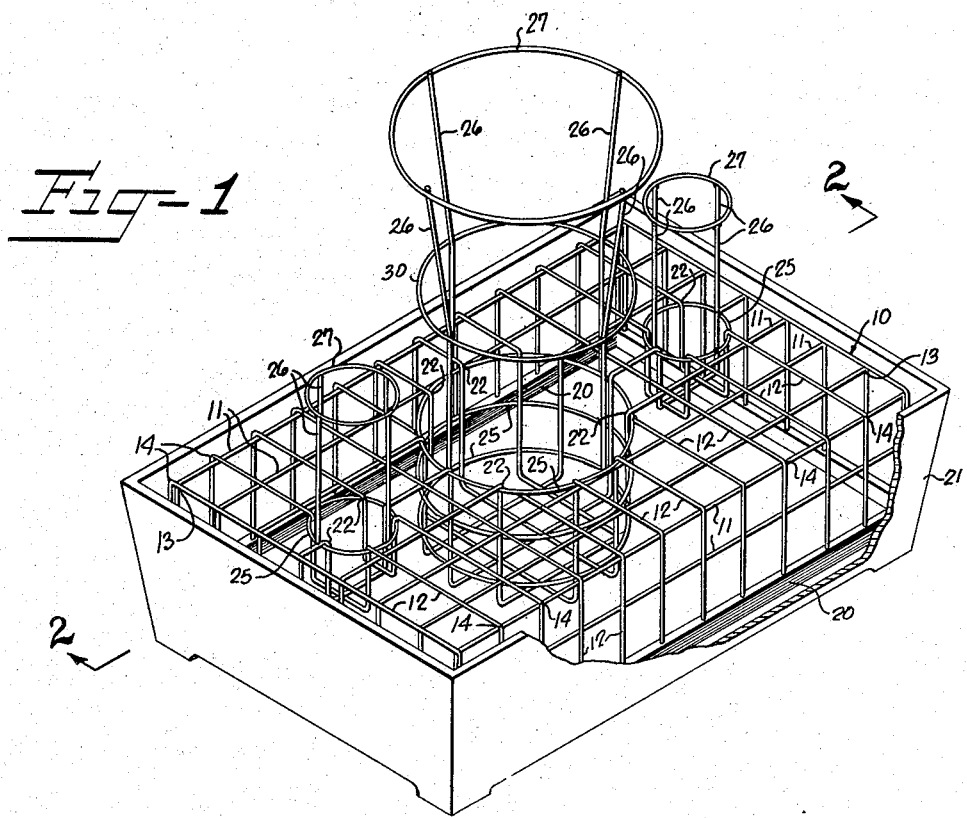
Figure 1 is an isometric view showing the improved combination flower, candle and vase holder resting in an open-topped container or tray.
Figure 2:
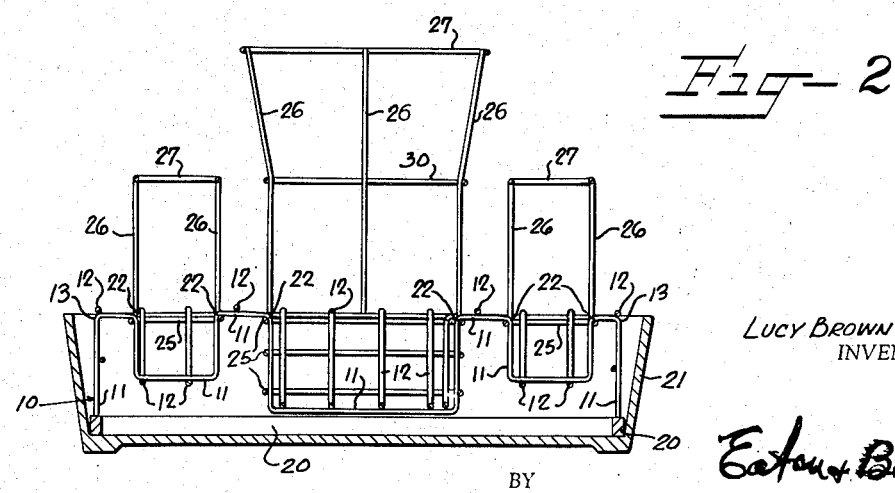
Figure 2 is a vertical sectional view taken substantially along the line 2—2 in Figure 1.

Referring more specifically to the drawings, the numeral 10 broadly designates the improved flower, candle and vase holder which comprises a plurality of parallel spaced longitudinally extending members 11 which are shown in the form of wires, and a plurality of parallel spaced transversely extending members 12 which are also shown in the form of wires and which are joined together at their junctures in any suitable manner such as by welding to form a coarse wire mesh material.

The longitudinally extending and transversely extending members 11 and 12 are bent downwardly at opposed ends thereof, as at 13 and 14, respectively, to form side walls and end walls of the flower holder 10. If so desired, a suitable peripheral frame member 20 may be provided to which the lower ends of the downturned portions of the longitudinally and transversely extending members 11 and 12 may be suitably secured or embedded as desired. The flower holder 10 and the peripheral frame 20 are shown as being substantially rectangular, it being understood, however, that the shape of the peripheral frame 20 and the flower holder 10 may vary as desired according to the type and size of the container with which the flower holder 10 is adapted to be used. The longitudinally extending members 11 and the transversely extending members 12 form a mesh structure with a plurality of openings therein adapted to receive stems of cut flowers and the like.

The present flower holder 10 is shown resting on the bottom of a suitable container or tray 21 which may contain a supply of water or other fluid in which the stems of plants and the like may be partially submerged as they are inserted through the openings formed by the longitudinally and transversely extending members 11 and 12. The water or fluid is omitted from the drawings for purposes of clarity.

It will be observed that some of the longitudinally extending and transversely extending members 11 and 12 are bent downwardly, as at 22 and extend downwardly for a substantial distance and then extend parallel to their upper portions and again are bent upwardly to form pockets or cups of varying size and, it is evident that these pockets may also vary as to shape. In the drawings, the pockets are shown as being circular and are circumscribed by pocket-defining members 25 which are shown as being annular but which also may be of any desired shape. These pocket-defining members 25 vary in size, the centermost in Figure 1 of which is shown as being substantially larger than those disposed on either side thereof. The centermost of the pockets is adapted to receive the lower end of a vase while the pockets on each side of the centermost pocket are adapted to receive the lower end of a candle. Large-stemmed flowers may also be inserted in the pockets should they be too large to pass through the meshes of the holder. These pocket-defining members 25 may be secured, as by welding, to the longitudinally and transversely extending members 11 and 12 adjacent the points 22 at which they are bent downwardly.

If so desired, the longitudinally and transversely extending members 11 and 12 may be severed at their juncture with the pocket-defining members 25 and the pocket-defining members 25 may support a cup-like container of any desired shape in place of the pockets formed by the longitudinally and transversely extending members 11 and 12.

The pocket-defining members 25 have a plurality of uprising posts or frame members 26 welded at various points thereto and the upper ends of these posts or frame members 26 are welded to second defining members 27 which may be of substantially the same configuration as the first-named pocket-defining members 25. It is obvious, that when it is desired to use the holder 10 with a vase which has a greater diameter at its upper end than at its lower end, the defining members 27 would be of substantially greater diameter than the defining members 25. If so desired, a third defining member 30 may circumscribe the posts 26 and may be secured, as by welding, intermediate the ends thereof.

The pockets defined by the members 25 may vary in size, and in the drawings one relatively large pocket is shown for the reception of a vase or the like and two smaller pockets are shown for reception of candles or the like, it being understood that a single pocket only may be formed if desired or a plurality of pockets of various sizes and spaced in any desired manner may be formed in the holder 10, if desired.

If desired, the uprising posts 26 may have their upper ends flush with the uppermost pocket defining members 25, thus eliminating the pocket defining members 27 and 30 to thus permit a flared top vase to be inserted into one or more of the pockets. Also, if desired, the uprising posts may be insertable and removable from the pockets.

It is thus seen that I have provided an improved flower, candle and vase holder formed of a wire mesh material having longitudinally extending and transversely extending members which are bent downwardly and then laterally intermediate their ends to form one or more pockets into which a vase or candle may be inserted, said pockets supporting the same in an upright position, and the wire mesh material also serving to support the stems of cut flowers and the like.

In the drawing and specification there has been set forth a preferred embodiment of the invention and although specific terms are employed they are used in a generic and descriptive sense only and not for purposes of limitation, the scope of the invention being defined in the claims.

I claim:

1. An improved combination flower, candle and vase holder formed of a plurality of spaced longitudinally extending members and a plurality of spaced transversely extending members suitably secured to each other at their junction points, and some of said transversely and longitudinally extending members extending downwardly intermediate their ends to form pockets into which a vase or candle may be inserted to support the same in an upright position.

2. An improved combination flower, candle and vase holder formed of a plurality of spaced longitudinally extending members and a plurality of spaced transversely extending members suitably secured to each other at their junction points, some of said transversely and longitudinally extending members extending downwardly intermediate their ends to form pockets into which a vase or candle may be inserted to support the same in an upright position, and a pocket-defining member extending around the upper edge of the pockets formed by the transversely and longitudinally extending members.

3. An improved combination flower, candle and vase holder formed of a plurality of spaced longitudinally extending members and a plurality of spaced transversely extending members suitably secured to each other at their junction points, some of said transversely and longitudinally extending members extending downwardly intermediate their ends to form pockets into which a vase or candle may be inserted to support the same in an upright position, a pocket-defining member extending around the upper edge of the pockets formed by the transversely and longitudinally extending members, a plurality of spaced upstanding posts welded at their lower ends to the pocket-defining members and a second defining member connecting the upper ends of the posts to assist in supporting vases, candles, and the like.

4. A flower, vase and candle holder comprising a plurality of longitudinally and transversely extending spaced members secured to each other to form a mesh and extending downwardly at their outer ends to form side walls, some of said longitudinally and transversely extending members also extending downwardly intermediate said side walls to form U-shaped pockets of varying sizes, said pockets being adapted to support vases, candles and the like.

5. A combination flower and vase holder comprising a plurality of longitudinally and transversely extending members secured to each other to form a foraminated surface, the opposed ends of said longitudinally and transversely extending members extending downwardly to form side walls, some of said longitudinally and transversely extending members being cut away intermediate their ends to form openings of various sizes in the foraminated surface, a pocket-defining member secured to said longitudinally and transversely extending members adjacent each of said openings, and a cup member secured to and depending from each of said pocket defining members.

6. A combination flower and vase holder comprising a plurality of longitudinally and transversely extending members secured to each other to form a foraminated surface, the opposed ends of said longitudinally and transversely extending members extending downwardly to form side walls, some of said longitudinally and transversely extending members being cut away intermediate their ends to form openings of various sizes in the foraminated surface, a pocket-defining member secured to said longitudinally and transversely extending members adjacent each of said openings, and a cup member secured to and depending from each of said pocket defining members, a plurality of upstanding posts secured at their lower ends to the pocket-defining members and at least one second defining member secured adjacent the upper ends of the posts to further assist in supporting articles disposed in the cup member.

7. A holder for supporting and displaying a plurality of articles such as flowers, vases and the like, said holder having side walls and a top surface of coarse mesh screen through which the stems of flowers may be inserted, and said top surface having at least one circular opening therein of larger diameter than the size of the mesh of the wire for receiving a container for holding flowers, candles and the like.

LUCY BROWN JAMES.

REFERENCES CITED

The following references are of record in the file of this patent:

UNITED STATES PATENTS

| Number | Name | Date |
|---|---|---|
| D. 84,793 | Schling | Aug. 4, 1931 |
| 809,558 | Gault | Jan. 9, 1906 |
| 1,153,028 | Chalk | Sept. 7, 1915 |
| 1,260,042 | Pullman | Mar. 19, 1918 |
| 1,992,411 | Bruce | Feb. 26, 1935 |
| 2,257,192 | Romney | Sept. 30, 1941 |